United States Patent Office 2,887,473
Patented May 19, 1959

2,887,473

POLYMERIZATION OF ETHYLENE

Joseph Hendrickson Balthis, Jr., Mendenhall, Pa., assignor to E. I. du Pont de Nemours and Company, Wilmington, Del., a corporation of Delaware No Drawing. Application May 2, 1955
Serial No. 505,523

16 Claims. (Cl. 260—94.9)

This invention relates to an improved process for polymerizing ethylene.

It has recently been reported (U.S. Patents 2,692,257 and 2,692,258) that a catalyst composed of a molybdenum-oxygen compound in which the molybdenum is present in some measure in the subhexavalent state, in combination with alumina or an oxide of titanium or zirconium, is effective for polymerization of ethylene to solid polymers.

It has now been discovered, in accordance with the present invention that a highly active catalyst for polymerization of ethylene to solid polymers is formed by admixing a molybdenum compound having molybdenum at a valence state of 5 to 6 inclusive with molybdenum metal or with a compound of a metal of groups V(a) and VI(a) of the periodic table, having atomic numbers of from 23 to 74 inclusive, the valence of said metal in said compounds being not more than four.

This invention provides an improved process for polymerizing ethylene to solid, high molecular weight, polymers possessing a combination of high stiffness and tensile strength.

The polymerization of the ethylene can be effected under conditions of temperature and pressure varying from 25° to 250° C. and 3 to 300 atmospheres.

In a convenient method of operation, a pressure reactor of about 400 cc. capacity is charged, in the absence of air, with the catalyst and an organic reaction medium, e.g., xylene, in amount sufficient to occupy about one-fourth of the reactor volume. Thereafter ethylene is admitted to about 30 atmospheres and the charged reactor placed in a reciprocating rack equipped with heating means. Heating and agitation are started and additional ethylene is added to maintain the pressure at 30 to 150 atmospheres, while the temperature is raised to a value within the range from 25° to 250° C. The polymerization is permitted to proceed until the rate of ethylene absorption becomes slow, for example, from four to sixteen hours. Thereafter the reactor is cooled, opened, and the contents discharged. Solid ethylene polymer and catalyst may be separated from solvent and oily polymer by filtration. Solid polymer is then recovered from the filter cake by extraction with one or more organic solvents, suitably boiling benzene to dissolve polymers of lower molecular weight, followed by boiling xylene to dissolve polymer of higher molecular weight. The ethylene polymers may be precipitated from the extracts by dilution with methanol.

The examples which follow are submitted to illustrate and not to limit this invention. Inherent viscosities are determined at 0.1% concentration in tetrahydronaphthalene at 125° C.

*Example I*

Under a blanket of nitrogen, 100 ml. of xylene, 4.06 g. (0.0201 mole) of molybdenum trichloride and 5.58 g. (0.0204 mole) of molybdenum pentachloride were added to a 400 cc. pressure reactor. The reactor was then cooled in a solid carbon dioxide bath, evacuated, pressured with ethylene to 575 lbs./sq. in., agitated by means of a reciprocating rack, and electrically heated. Shortly after starting to heat, polymerization began, as evidenced by an exothermic temperature flash from 52° to 115° C. and an abrupt drop in pressure. The reactor was allowed to cool to between 57° to 90° C. and maintained at this level for 12 hours. Meantime ethylene was added, as necessary, to maintain pressure at 500 to 900 lbs./sq. in. for the first four hours, at 850 to 1100 lbs./sq. in. for the next four hours, and at 1900 to 2500 lbs./sq. in. for the final four hours. Paste-like material removed at the conclusion of the polymerization weighed 245.2 g. Oil (70.8 g.) was separated by suction filtration; the oil contained a methanol-insoluble fraction (39 g.) which congealed when cooled to 0° C. The filter cake was comminuted with methanol in a Waring-Blendor, and the mixture was filtered. The filtrate included methanol-insoluble oil (41 g.) and a few grams of grease-like polymer that precipitated on cooling. The filter cake, which weighed 89.7 g., was extracted with boiling benzene to remove lower molecular weight solid polyethylene and then with boiling xylene to extract higher molecular weight solid polyethylene. The two fractions of dissolved polyethylene were reprecipitated by dilution with methanol and weighed 45.2 and 15.7 g., respectively, with corresponding inherent viscosities of 0.08 and 0.12.

*Example II*

Example I was repeated, charging 4.52 g. (0.023 mole) of molybdenum trichloride, 7.86 g. (0.029 mole) of molybdenum pentachloride, and 100 ml. of xylene, and pressuring with ethylene to 600 lbs./sq. in. Polymerization started at 80° C. and was allowed to proceed at 80° to 99° C. with a final ethylene pressure of 2000 lbs./sq. in. Material removed from the reactor weighed 267.6 g. Work-up in the manner described in Example I gave 45.3 g. of benzene-extracted solid polyethylene and 16.3 g. of xylene-extracted solid polyethylene. The inherent viscosities were 0.06 and 0.31, respectively.

*Example III*

A pressure reactor was charged under a nitrogen blanket with 100 ml. of xylene and 5.63 g. of "molybdenum tetrachloride," cooled, evacuated, and pressured with ethylene as described in Example I. The temperature was raised to 225° C. and the pressure to 2500 lbs./sq. in. in seven hours. These conditions were maintained for five additional hours. Material removed from the reactor, after cooling, weighed 114.7 g. Two grams of solid polyethylene was recovered by filtering and extracting the filter cake in boiling xylene.

The "molybdenum tetrachloride" used in the above example was prepared by the high temperature disproportionation of molybdenum trichloride in nitrogen to molybdenum dichloride and "molybdenum tetrachloride." The tetrachloride is known to be unstable at ordinary temperatures and also to disproptionate at least in part to $MoCl_3$ and $MoCl_5$ on heating.

*Example IV*

A 400 ml. silver-lined pressure reactor was purged with nitrogen and charged with 100 ml. of xylene, 4.55 g. (0.017 mole) of molybdenum pentachloride, and 5.2 g. (0.041 mole) of pyrophoric molybdenum (IV) oxide prepared as described below. The reactor was cooled with a solid carbon dioxide bath, evacuated, agitated, and pressured with ethylene to 500 lbs./sq. in. at 20° C. Temperature and pressure were raised to 44° C. and 575 lbs./sq. in. in 18 minutes, whereupon the temperature spontaneously rose to 114° C. and the pressure dropped to 300 lbs./sq. in. The reactor was repressured with ethylene, and temperature and pressure were slowly raised. Appreciable ethylene absorption began at 175° C. and 1500 lbs./sq. in. Agitation was continued for 14 hours, during which time the temperature was kept at 179° to 180° C. and the pressure at 1500 lbs./sq. in. The total pressure drop was 1235 lbs./sq. in. The reactor was cooled; the pasty mass of polymer and solvent removed from the reactor weighed 182 g. The product was ground in a Waring Blendor with methanol and filtered. The solid waxy filter cake weighed 75 g. One-half of this solid was extracted continuously with boiling benzene and the polymer (5.1 g.) precipitated by addition of the benzene was recovered by extraction with boiling xylene and precipitation with methanol. In this manner there was obtained 3.0 g. of xylene extractable polymer. The total yield of benzene soluble polymer was 10.2 g. and of xylene soluble polymer 6.0 g. The xylene extracted polymer had an inherent viscosity of 1.79. It was pressed, into a film at 170° C. and 12,000 lbs./sq. in. pressure in a Carver Press. The film exhibited an elongation of 19 to 52%, a tensile strength of 3300 to 3600 lbs./sq. in., and a modulus of stiffness (Olson Tester) of 156,000 to 166,000 lbs./sq. in.

The pyrophoric molybdenum (IV) oxide used in this example was prepared by reducing 8–14 mesh ammonium octamolybdate (Mellor, "Comprehensive Treatise on Inorganic and Theoretical Chemistry," vol. XI, p. 595) with deoxygenated hydrogen for 24 hours at 400° C. at a space velocity of 500 hrs.$^{-1}$. The hydrogen was deoxygenated by passage over a palladium-on-alumina catalyst. Further purification of the hydrogen consisted of treatment with activated charcoal, anhydrous calcium sulfate, and phosphorus pentoxide. The product was a pyrophoric black solid which gave a clear, sharp X-ray diffraction pattern of molybdenum (IV) oxide. The yield on reduction was 77.2% (calculated, 78.2%). Average molybdenum valence in the product was 3.87 (calculated, 4.0). Molybdenum: Found, 75.56%; calc'd, 74.99%.

*Example V*

Example IV was repeated, except that the charge consisted of 100 ml. of xylene, 7.0 g. of the pyrophoric molybdenum, and 5.19 g. of molybdenum pentachloride. The temperature and ethylene pressure was slowly raised to 50° C. and 500 lbs./sq. in., at which point the temperature spontaneously rose to 69° C. and the pressure dropped to 150 lbs./sq. in. The reactor was cooled to 60° C. and the pressure raised to 500 lbs./sq. in., whereupon the temperature spontaneously flashed to 100° C. Lively absorption of ethylene then took place at 82° to 86° C., and ethylene pressure was maintained at 600 lbs./sq. in. by periodically repressuring for three hours. The pressure drop then became slower and the pressure was eventually raised to 2500 lbs./sq. in. to force the reaction further. Reaction time was 11 hours and total pressure drop was 5955 lbs./sq. in The product from the reactor was a pasty mass which weighed 305.4 g. Purification, as previously described, gave 58.8 g. of benzene extractable and 6.8 g. of xylene extractable polyethylene. The inherent viscosity of the polymer extracted with xylene was 0.28.

The pyrophoric molybdenum used in the above example was prepared by hydrogen reducing powdered commercial phosphomolybdic acid (Mallinkrodt, "Acid Phosphomolybdic," $P_2O_5 \cdot 20MoO_3 + Aq.$) which had been calcined for 88 hours at 200° C. The hydrogen used for reduction was deoxygenated over copper at 400° C. Reduction was carried out at atmospheric pressure for 24 hours at 600° C. with a hydrogen space velocity of 1000 hrs.$^{-1}$. The reduced catalyst was a pyrophoric gray to black powder with a surface area of 35.5 m.$^2$/g. It gave an X-ray diffraction pattern typical of elementary molybdenum.

*Example VI*

Example IV was repeated, except that the reactor was charged with 100 ml. of xylene, 5.41 g. (0.0198 mole) of molybdenum pentachloride and 5.71 g. (0.0196 mole) of vanadium tribromide. A spontaneous temperature flash occurred at 59° C. and 500 lbs./sq. in. ethylene pressure. Most of the ethylene absorption took place in the range of 500 to 800 lbs./sq. in. and 60° to 85° C. The total pressure drop was 3350 lbs./sq. in., and the total weight of material from the reactor was 287 g. Work-up, as described above, gave 55.2 g. of benzene extractable solid polyethylene and 29.6 g. of xylene extractable solid polyethylene.

*Example VII*

The polymerization procedure of Example IV was repeated, except that the reactor was charged with 100 ml. of xylene, 7.35 g. of molybdenum pentachloride and 7.0 g. of vanadium (III) oxide. The absorption of ethylene was very rapid at 67° to 98° C. and 400 to 700 lbs./sq. in. and was essentially complete in seven hours. However, agitation was continued for another ten hours, during which time the pressure was raised to 800 lbs./sq. in. The total pressure drop was 4325 lbs./sq. in. The weight of material recovered from the reactor was 225 g. The yield of benzene extractable solid polyethylene was 80.2 g. and the yield of xylene extractable solid polymer was 14.5 g.

The vanadium trioxide catalyst used in the above example was prepared by reducing commercial ammonium metavanadate (8–14 mesh, Vanadium Corporation of America) in hydrogen at atmospheric pressure for 24 hours at 450° C. and a space velocity of 500 hrs.$^{-1}$. The product was a black pyrophoric solid with a surface area of 14.7 m.$^2$/g. The yield of oxide obtained was 64.4%. X-ray analysis showed a strong, sharp pattern of hexagonal $V_2O_3$, accounting for all lines of the pattern. The product analyzed 67.30% vanadium. The calculated value in $V_2O_3$ is 68.1% (H. R. Arnold, N.B. 9256-75, 2/3/55).

*Example VIII*

Example VII was repeated, except that the reactor was charged with 100 ml. of cyclohexane, 6.16 g. of molybdenum pentachloride and 6.0 g. of vanadium (III) oxide, prepared as described in Example VII. Ethylene absorption was rapid at 50° to 122° C. and 500 to 1000 lbs./sq. in. Further ethylene absorption occurred when the temperature and pressure were raised to 180° C. and 1250 lbs./sq. in., respectively. Total pressure drop was 1665 lbs./sq. in. The semi-solid mass recovered from the reactor weighed 175 g. After comminuting with methanol and filtering, the solid filter cake weighed 88 g.

*Example IX*

Example IV was repeated, except that the reactor was charged with 100 ml. of xylene, 5.62 g. of molybdenum pentachloride, and 9.0 g. of reduced phosphomolybdic acid. The reactor was agitated and pressured with ethylene to 500 lbs./sq. in. at 20° C. At 47°C. a temperature flash occurred. Ethylene absorption was rapid in the range 57° to 88° C. and 500 to 1000 lbs./sq. in., and the major part of the absorption was complete in seven hours. The weight of material recovered was 270 g. After comminution with methanol and filtering, the solid filter cake weighed 138 g.

The reduced phosphomolybdic acid was prepared as described in Example II in Arnold, Fawcett and Gilbert, U.S. patent application, Ser. No. 368,487, filed July 10, 1953, by reducing commercial phosphomolybidic acid, pre-dried at 200° C., with hydrogen at 400° C.

*Example X*

Example I was repeated, except that the reactor was charged with 100 ml. of xylene, 6.01 g. (0.022 mole) of molybdenum pentachloride and 4.85 g. (0.024 mole) of molybdenum trichloride. Over a period of 17 hours ethylene was absorbed in the range 1000 to 2500 lbs./sq. in. at 100° to 184° C. The reactor was discharged to give 154 g. of material, from which crude solid polymer was obtained by filtration. Work-up, in the manner previously described, gave 0.75 g. of benzene extractable and 1.18 g. of xylene extractable polymer. The polymer obtained from the xylene extraction had an inherent viscosity of 2.57.

*Example XI*

The procedure of Example I was repeated, charging 3.43 g. (0.0126 mole) of molybdenum pentachloride, 3.82 g. (0.023 mole) molybdenum dichloride, and 100 ml. of xylene. Maximum temperature during polymerization was 220° C. and maximum pressure was 4900 lbs./sq. in. Material removed from the reactor weighed 117.7 g. Work-up in the usual manner gave 10.5 g. of methanol-insoluble oil and 1.2 g. of solid polyethylene.

*Example XII*

Example IV was repeated, except that the reactor was charged with 100 ml. of cyclohexane, 6.85 g. of molybdenum pentachloride, and 2.5 ml. of vanadium tetrachloride. The reactor was agitated and pressured with ethylene to 500 lbs./sq. in. at 20° C. The temperature rose spontaneously to 40° C. and the pressure dropped to 340 lbs./sq. in. Thereafter the temperature was maintained at 80° to 83° C. and the pressure at 500 to 1500 lbs./sq. in. for 14 hours, during which time there was a total drop in pressure of 3980 lbs./sq. in. The weight of solid and liquid recovered from the reactor was 178.2 g. The solid was collected and washed repeatedly with methanol to remove as much catalyst, oil, and solvent as possible. The weight of crude, air-dried polymer was 46.5 g.

Extraction of 20 g. of the crude polymer gave 6.8 g. of benzene-extractable and 8.8 g. of xylene-extractable polyethylene. In addition, there remained in the extraction thimble 3.1 g. of polymer which was insoluble in boiling benzene and in boiling xylene.

*Example XIII*

Example IV was repeated, except that the reactor was charged with 100 ml. of xylene, 6.08 g. of molybdenum pentachloride, and 6.35 g. of vanadium dibromide. The reactor was agitated and pressured with ethylene to 500 lbs./sq. in. at 20° C. The temperature was slowly raised and at 51° C. there was a rapid, spontaneous, temperature rise to 135° C. The reactor was then cooled to 70° C. and maintained at 70° to 75° C. for 16 hours. Throughout the reaction period the ethylene pressure was maintained at 700 lbs./sq. in. by periodic repressuring with ethylene. The total observed pressure drop was 1555 lbs./sq. in. Work-up of the polymer, in the manner described previously, gave 38.8 g. of benzene extractable polyethylene and 13.7 g. of higher molecular weight polymer, obtained by xylene extraction.

*Example XIV*

Example IV was repeated, except that the reactor was charged with 100 ml. of xylene, 6.42 g. of molybdenum pentachloride and 3.9 g. of chromium (IV) oxide ($CrO_2$), prepared as described below. During 17 hours' reaction period, the temperature was maintained at 102° to 104° C. and the ethylene pressure at 800 lbs./sq. in. The total pressure drop over the reaction period was 1920 lbs./sq. in. The weight of reaction product recovered was 181 g. The crude solid polymer was washed with methanol and air-dried. The weight of product thus obtained was 72 g.

The chromium (IV) oxide used in the above experiment was prepared as follows:

Chromium trioxide (50 g.) was charged into a 9¼" x ⅝" platinum tube. Each end of the tube was sealed with a platinum disc held by means of a steel coupling. The disc at one end of the tube was loose enough to allow pressure equalization inside and outside of the tube. The tube was then filled with water and placed in a Hastelloy C lined pressure reactor filled with water. The reactor was heated and pressured to 2500 atmospheres at 400° C. for 0.5 hour. The reactor was cooled, depressured and the contents discharged. The solid contents of the platinum tube was recovered by filtration, washed with water and acetone and air-dried. There was recovered in this manner 40 g. of essentially pure chromium dioxide.

*Example XV*

A 400-ml. silver-lined pressure reactor was charged with 100 ml. of xylene and 6.5 g. of vanadium tribromide. The reactor was cooled in a solid carbon dioxide bath, evacuated and 5 to 6 g. of molybdenum hexafluoride was added by means of a copper inlet line. The reactor was then agitated and pressured with ethylene to 500 lbs./sq. in. at 20° C. Ethylene was absorbed in the range 140° to 142° C. and 1000 lbs./sq. in. pressure. The total absorption over 18 hours amounted to 1600 lbs./sq. in. The material discharged from the reactor consisted of solid polymer suspended in solvent and liquid polymer. The total weight of this material was 210.2 g. Of this total, 133.8 g. was methanol insoluble liquid polymer and 11.5 g. was crude solid polymer. Extraction of the solid with boiling benzene and precipitation of the polymer with methanol produced 1.2 g. of benzene extractable polyethylene. The high molecular weight polyethylene (4.4 g.) was recovered by continuous extraction with boiling xylene.

A run similar to the above, except that the vanadium tribromide was omitted from the charge did not give any solid polyethylene and only a small amount of liquid polymer was formed.

The catalysts used in the process of this invention are combinations of a molybdenum halide in which the molybdenum is hexavalent or pentavalent, with either finely divided molybdenum or a halide, oxide, or salt of molybdenum or other metal of atomic numbers 23 to 74 from groups V(a) and VI(a) in a valence of four or less. Examples of such metals are vanadium, chromium, tungsten, and molybdenum. Examples of halides of hexavalent and pentavalent molybdenum are $MoF_6$, $MoCl_5$ and $MoOCl_3$. Oxides, halides and salts of molybdenum and other metals of atomic numbers 23 to 74 from groups V(a) and VI(a) are $MoO_2$, $Mo_2O_3$, $WO_2$, $VO$, $V_2O_3$, $VO_2$, $CrO_2$, $MoCl_2$, $MoCl_3$, $VCl_3$, $VBr_3$, $WI_4$, $WCl_2$, $WCl_4$, $CrCl_2$, $CrF_3$, molybdenum (III) oxyphosphate, molybdenum (III) acetylacetonate, etc.

In an alternative method for obtaining the desired plurality of valences, molybdenum pentachloride may be partially reduced in situ.

Hydrocarbons such as xylene, cyclohexane, isooctane, decahydronaphthalene, etc., constitute preferred reaction media, and the molybdenum pentachloride may be dissolved or suspended therein. For maximum catalytic activity, the second component of the catalyst, which may be insoluble in the reaction medium, should be finely divided. For example, pyrophoric molybdenum and pyrophoric molybdenum dioxide are operable with molybdenum pentachloride whereas the usual coarse forms of these materials may be catalytically inactive.

The ratio of molybdenum hexahalide or pentahalide to metal or metal compound is not critical. The molar ratio of the molybdenum hexahalide or pentahalide to the second component should be within the range of approximately 0.1 to 10. For best results, however, catalysts are used in which the ratio of molybdenum hexahalide or pentahalide to the second component is approximately equimolar.

The manner in which the molybdenum hexahalide or pentahalide and other component interact to form a catalyst is not known. Merely contacting the two appears to suffice. However, it is desirable to employ efficient agitation. It is also desirable to avoid exposure to moisture and oxygen prior to and during use.

The molybdenum hexahalide or pentahalide and the metal or metal compound may, if desired, be pre-reacted, for example, in the boiling hydrocarbon solvent at atmospheric pressure, or in situ at higher temperatures under autogenous pressure. It appears, however, that no prereaction is necessary beyond that taking place as the temperature of the reactor is raised to the temperature at which polymerization takes place.

In certain embodiments it is preferred to utilize the lowest practical temperatures and pressures, and satisfactory reaction rates are usually realized at temperatures of 50° to 180° C. and pressures of 500 to 2000 lbs./sq. in.

The quantity of molybdenum hexahalide or pentahalide/elementary molybdenum, molybdenum oxide or halide or other metal compound used in the polymerization of ethylene must be sufficient to induce polymerization at a practical rate. Suitably, the quantity will be within the range of 0.001% to 25% by weight of the ethylene charged.

Ethylene from any source may be used provided it is reasonably pure and substantially free of moisture and oxygen. Impurities may induce deleterious side reactions and reduce the yield of solid polymer.

The equpiment in which the polymerization is effected may be made of, or lined with, material which has no deleterious effect on the polymerization. Silver-lined pressure reactors are suitable.

Methods for preparing elementary finely divided molybdenum and the various halides and oxides of molybdenum and other metals are described in the literature.

Solid substantially linear polyethylene produced by the method of this invention is frequently characterized by unusually high tensile strength and stiffness and is useful in numerous applications such as in the form of films, fibers, molded objects, etc.

In the polymerization there are frequently obtained oily and waxy polymers of lower molecular weight, along with high molecular weight polyethylene.

Residual solvent, catalyst, and oil may be separated from the solid polymer in any desired manner, for example by filtration, extraction, or washing procedures. Thus, solid polyethylene of moderate molecular weight may be extracted with boiling benzene and reprecipitated by dilution with methanol. Polyethylene of still higher molecular weight may then be extracted with boiling xylene and reprecipitated with methanol.

While the examples illustrate batch operation, it is within the scope of this invention to conduct the polymerization continuously by, for example, passing the mixture of ethylene and hydrocarbon over the catalysts or by continuously charging ethylene, hydrocarbon, and catalyst.

When used alone, molybdenum pentachloride induces polymerization of ethylene predominantly to oil; a temperature of about 180° C. is required at 2500 lbs./sq. in. pressure.

As described in Foster and Whitman, U.S. patent application, Ser. No. 453,694, filed September 1, 1954, reduced phosphomolybdic acid itself catalyzed polymerization of ethylene to solid polymer at about 225° C. and 2500 lbs./sq. in. ethylene pressure. When the reduced phosphomolybdic acid is used with molybdenum pentachloride, polymerization takes place at materially lower temperatures and pressures.

I claim:

1. Process for polymerizing ethylene which comprises conducting the polymerization at a temperature of from 25° to 250° C. and a pressure of from 3 to 300 atmospheres in the presence of a catalyst formed by admixing a member of the class consisting of molybdenum pentahalides and molybdenum hexahalides with a second component which is a member of the class consisting of metallic molybdenum, oxides of metals of groups V($a$) and VI($a$) of the periodic table having atomic numbers from 23 to 74, inclusive, and halides of said metals, the valence of the said metal in said oxides and halides being not more than 4, the molar ratio of the said molybdenum halide to the said second component being from 10:1 to 1:10.

2. Process for polymerizing ethylene to solid polymer which comprises conducting the polymerization at a temperature of from 25° to 250° C. and a pressure of from 3 to 300 atmospheres in the presence of a catalyst composed of molybdenum pentachloride and a second component which is a member of the class consisting of metallic molybdenum, oxides of metals of groups V($a$) and VI($a$) of the periodic table having atomic numbers of 23 to 74, inclusive, and halides of said metals, the valence of said metal in said oxides and halides being not more than 4, the molar ratio of the said molybdenum pentachloride to the said second component being from 10:1 to 1:10.

3. Process for polymerizing ethylene to solid polymer which comprises conducting the polymerization at a temperature of from 25° to 250° C. and a pressure of from 3 to 300 atmospheres in the presence of a catalyst consisting essentially of a molybdenum halide wherein the molybdenum has a valence of from 2 to 3, inclusive, and molybdenum pentahalide in molar ratio of 10:1 to 1:10.

4. Process for polymerizing ethylene to solid polymer which comprises conducting the polymerization at a temperature of from 25° to 250° C. and a pressure of from 3 to 300 atmospheres in the presence of a catalyst formed by bringing together pyrophoric molybdenum oxide with molybdenum pentachloride in molar ratio of 10:1 to 1:10.

5. Process for polymerizing ethylene to solid polymer which comprises conducting the polymerization at a temperature of from 25° to 250° C. and a pressure of from 3 to 300 atmospheres in the presence of a catalyst formed by bringing together a molybdenum halide wherein the valence of the molybdenum is from 5 to 6, inclusive, with a vanadium halide wherein the vanadium has a valence of from 2 to 4, inclusive in molar ratio of 10:1 to 1:10.

6. Process of claim 5 wherein said molybdenum halide is molybdenum pentachloride.

7. Process of claim 5 wherein said molybdenum halide is molybdenum hexafluoride.

8. Process of claim 5 wherein said vanadium compound is a vanadium trihalide.

9. Process of claim 5 wherein said vanadium compound is a vanadium tetrahalide.

10. Process for polymerizing ethylene to solid polymer according to claim 2 which comprises conducting the polymerization in the presence of a catalyst formed by bringing together molybdenum pentachloride with an oxide of a metal of groups V($a$) and VI($a$) of the periodic table, said metal having a valence of 3 to 4 in said oxide, the molar ratio of said pentachloride to said oxide being 10:1 to 1:10.

11. Process for polymerizing ethylene which comprises heating ethylene at a polymerization temperature within the range of 25° to 250° C., and a polymerization pressure within the range of 3 to 300 atmospheres, in the presence of a liquid hydrocarbon reaction medium, and from 0.001% to 25%, by weight of the ethylene charged, of a catalyst composed of a molybdenum pentahalide and, as a second component, a member of the class consisting of metallic molybdenum, oxides of metals of groups V($a$) and VI($a$) of the periodic table having atomic numbers from 23 to 74, inclusive, and halides of said metals, the valence of said metal in said compounds being not more than 4, whereby polymerization of ethylene occurs, and thereafter separating from the resulting mixture the solid ethylene polymer produced by the said polymerization, the molar ratio of said pentahalide to said second component being 10:1 to 1:10.

12. Process of claim 11 wherein the said second component is a vanadium halide.

13. Process of claim 12 wherein said vanadium halide is $VCl_4$.

14. Process of claim 11 wherein the said vanadium halide is $VBr_3$.

15. Process of claim 11 wherein the said second component is an oxide of a metal of group V(a) and group VI(a) of the periodic table, said metal having a valence of 3 to 4, inclusive.

16. Process of claim 11 wherein said second component is molybdenum trichloride.

References Cited in the file of this patent

UNITED STATES PATENTS

| | | |
|---|---|---|
| 2,092,295 | Van Peski et al. | Sept. 7, 1937 |
| 2,692,258 | Roebuck et al. | Oct. 19, 1954 |